Feb. 9, 1932.  L. J. BUTTOLPH  1,844,421
APPARATUS FOR PRODUCING CHEMICAL REACTIONS BY
THE INFLUENCE OF RADIANT ENERGY
Original Filed Sept. 11, 1926
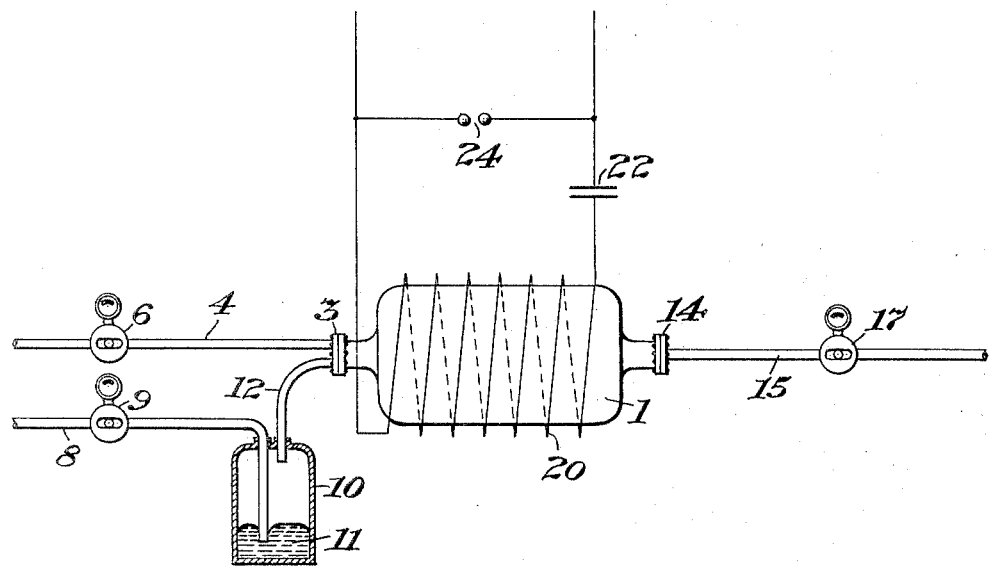

Patented Feb. 9, 1932

1,844,421

UNITED STATES PATENT OFFICE

LEROY J. BUTTOLPH, OF GRANTWOOD, NEW JERSEY, ASSIGNOR TO GENERAL ELECTRIC VAPOR LAMP COMPANY, OF HOBOKEN, NEW JERSEY, A CORPORATION OF NEW JERSEY

APPARATUS FOR PRODUCING CHEMICAL REACTIONS BY THE INFLUENCE OF RADIANT ENERGY

Original application filed September 11, 1926, Serial No. 134,814. Divided and this application filed February 9, 1928. Serial No. 253,159.

The present invention relates to process and apparatus for effecting catalytic chemical reactions through the use of electrically excited or activated gas or vapor molecules. It relates more particularly to method and apparatus for catalytically influencing the reactions of gases although the invention extends to reactions of liquids, solids, gases and mixtures thereof. The invention further relates to the method of and apparatus for producing catalyzing radiations within the body itself of the material to be so influenced.

As usually practiced a mixture of gases or other materials is subjected to the action of radiation originating from some source outside of the reaction chamber and reaching the material mixture by passage through the walls of said chamber which must be of a material such as quartz which will transmit the radiation. In case none of the components of the gas mixture will absorb the necessary radiation some additional material such as mercury vapor is introduced which will absorb the radiation and in turn transmit energy or otherwise activate the gases to produce a chemical reaction.

Many materials, such as mercury vapor and chlorine gas may be activated either by the absorption of radiant energy or by the action of a high frequency magnetic field. The material which is activated by the high frequency field to produce radiations which influence or cause a chemical reaction serves in some cases merely for this purpose. In other cases it is selected to be one of the materials entering the reaction. The use of such a material placed directly in a reaction chamber and activated by a high frequency field is the subject of this invention.

The invention consists in the new features of operation in the process hereinafter described and in apparatus for carrying out the methods or process of the invention and having the general characteristics of the apparatus shown and described herein as an example, and in the new and useful applications, and the several original features of utility hereinafter set forth and claimed.

In the accompanying drawing there is shown for purposes of illustration one form of apparatus embodying the invention in which there is diagrammatically shown a reaction chamber mounting for passing the gases thereto and therefrom and means for producing radiations within the reaction chamber and within the body of the gas being treated.

The reaction chamber 1 which is of material such as glass connects by the flange 3 and the inlet pipe 4 to a source of gas not shown. In pipe 4 is the pressure controller and indicator 6. Another gas feed pipe 8 having the pressure control and indicating means 9 therein serves to feed gas from a suitable source not shown through the chamber 10 containing the liquid 11 which is a source of radiation sustaining vapor and below the surface of which said pipe 8 terminates. From said chamber 10 near the top extends the pipe 12 to said chamber 1 through the flange 3. Connecting from chamber 1 through the flange 14 is the exhaust pipe 15 having a pressure control and indicating member 17 thereon. About chamber 1 is mounted the high frequency induction coil 20 which connects to a high frequency oscillatory circuit including the condenser 22 and the spark gap 24. This coil and circuit are adapted to induce a high frequency field in the chamber 1 in a manner well known in the high frequency induction heater art.

As an illustration of the use of the apparatus and of the method of the invention the following description is made of the process of producing hydrogen peroxide from hydrogen and oxygen gases. The high frequency field is produced in the chamber 1 by connecting the coil 20 and condenser 22 and spark gap 24 to a suitable source of alternating or interrupted current not shown. From a source not shown the pipe 8 carries either hydrogen or oxygen through the body of mercury 11 in chamber 10 and thence through pipe 12 into the chamber 1. In passing through the liquid mercury this gas carries with it into reaction chamber 1 a trace of mercury vapor. Said pipe 4 carries from a source not shown the other gas, oxygen or hydrogen, to produce in chamber 1 a mixture of oxygen, hydrogen, and mercury vapor.

The high frequency field induced in chamber 1 activates or excites the mercury vapor to produce radiations therefrom. Certain radiations from mercury vapor, particularly those having wave lengths in the neighborhood of 2536-7 Ångström units are effective in bringing about a reaction between hydrogen and oxygen to produce water vapor and hydrogen peroxide the proportions depending upon the gas pressure, temperature, etc. By producing the radiations within the mixture of the oxygen and hydrogen gases an efficient and rapid reaction process is maintained. This process is made continuous by passing the hydrogen and oxygen in the manner described, continuously through the reaction chamber and out through the exhaust pipe 15. The hydrogen peroxide, water, and mercury are separated after or as they pass from the reaction chamber. The regulators 6 and 9 and 17 are used to control the flow of gases and the product in accordance with proper reaction proportions of the gases and in accordance with the rate of progress of reaction.

The application of the invention to the production of water and hydrogen peroxide is given herein as an example and it is to be understood that the invention may be applied to the reaction of other substances and for the production of various products. For example, hydrogeniodide can be made by producing a high frequency electrical field about or in a mixture of iodine and hydrogen. The iodine gas or vapor will be energized by the high frequency field to produce radiations which will cause the iodine and hydrogen to combine.

This application is a division of my application Serial No. 134,814, filed September 11, 1926.

I claim:

1. In combination, a reaction chamber, means for passing a gas thereinto, means for passing another gas through a body of mercury and into the said chamber, means for carrying reaction products from the chamber, and means for generating an electrical discharge in the chamber.

2. In combination, a reaction chamber, means for passing a plurality of gases thereinto, means to introduce mercury vapor into said reaction chamber, means to produce an inductive electric discharge in said mercury vapor, and means to carry reaction products from said chamber.

Signed at Hoboken in the county of Hudson and State of New Jersey this 8th day of February A. D. 1928.

LEROY J. BUTTOLPH.